US011677548B2

(12) United States Patent
Medvinsky et al.

(10) Patent No.: US 11,677,548 B2
(45) Date of Patent: *Jun. 13, 2023

(54) SECURE DISTRIBUTION OF DEVICE KEY SETS OVER A NETWORK

(71) Applicant: ARRIS Enterprises LLC, Suwanee, GA (US)

(72) Inventors: Alexander Medvinsky, San Diego, CA (US); Jinsong Zheng, San Diego, CA (US); Jason A. Pasion, San Diego, CA (US); Xin Qiu, San Diego, CA (US); Tat Keung Chan, San Diego, CA (US); Eric Eugene Berry, El Cajon, CA (US); Michael Ryan Pilquist, Souderton, PA (US); Douglas M. Petty, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 162 days.

This patent is subject to a terminal disclaimer.

(21) Appl. No.: 17/355,930

(22) Filed: Jun. 23, 2021

(65) Prior Publication Data
US 2021/0320789 A1 Oct. 14, 2021

Related U.S. Application Data

(63) Continuation of application No. 16/358,821, filed on Mar. 20, 2019, now Pat. No. 11,063,753.

(51) Int. Cl.
*H04L 29/06* (2006.01)
*H04L 9/08* (2006.01)
(Continued)

(52) U.S. Cl.
CPC .......... *H04L 9/0844* (2013.01); *G06F 21/602* (2013.01); *H04L 9/0894* (2013.01);
(Continued)

(58) Field of Classification Search
CPC ... H04L 9/0844; H04L 9/0894; H04L 9/3234; H04L 9/3236; H04L 9/3247; H04L 9/3263; H04L 63/0884; G06F 21/602
See application file for complete search history.

(56) References Cited

U.S. PATENT DOCUMENTS 9,064,109 B2 * 6/2015 Smith ................. G06F 21/45
10,825,066 B2 * 11/2020 Macias .............. G06Q 30/0627
(Continued)

OTHER PUBLICATIONS

PCT International Search Report & Written Opinion, RE: Application No. PCT/US2019/023071, dated Sep. 10, 2019.
(Continued)

*Primary Examiner* — Sher A Khan
(74) *Attorney, Agent, or Firm* — Chernoff, Vilhauer, McClung & Stenzel, LLP

(57) ABSTRACT

A system is provided for distribution of device key sets over a network in a protected software environment (PSE). In the system, a client device includes a connection interface for receiving a crypto hardware (CH) token belonging to a user, untrusted software, a quoting enclave, and a PSE for generating a provisioning request for a device key set. An attestation proxy server (APS) receives the provisioning message using a first network connection, and transmits the provisioning message to an online provisioning server (OPS) using a second network connection. The OPS constructs a provisioning response and an encrypted device key set, and delivers the provisioning response to the untrusted software using the first and second network connections. The PSE decrypts the encrypted device key set to obtain the device key set, re-encrypts the device key set with a local chip-specific key, and stores the re-encrypted device key set.

16 Claims, 14 Drawing Sheets

(51) Int. Cl.
*H04L 9/40* (2022.01)
*H04L 9/32* (2006.01)
*G06F 21/60* (2013.01)

(52) U.S. Cl.
CPC .......... *H04L 9/3234* (2013.01); *H04L 9/3236* (2013.01); *H04L 9/3247* (2013.01); *H04L 9/3263* (2013.01); *H04L 63/0884* (2013.01)

(56) References Cited

U.S. PATENT DOCUMENTS

| | | | |
|---|---|---|---|
| 2003/0014372 A1* | 1/2003 | Wheeler | H04L 9/3231 705/71 |
| 2003/0059053 A1 | 3/2003 | Medvinsky | |
| 2003/0140007 A1* | 7/2003 | Kramer | G06Q 20/12 705/40 |
| 2003/0149871 A1 | 8/2003 | Medvinsky | |
| 2003/0149880 A1* | 8/2003 | Shamsaasef | H04L 9/083 713/182 |
| 2004/0008846 A1 | 1/2004 | Medvinsky | |
| 2005/0027985 A1 | 2/2005 | Sprunk | |
| 2006/0047601 A1 | 3/2006 | Peterka | |
| 2009/0165111 A1 | 6/2009 | Zhang | |
| 2010/0161966 A1* | 6/2010 | Kwon | H04L 9/3273 380/278 |
| 2014/0082359 A1* | 3/2014 | Nakhjiri | H04L 9/3066 713/168 |
| 2016/0149912 A1 | 5/2016 | Scott-Nash | |
| 2017/0163616 A1* | 6/2017 | Smith | H04L 63/061 |
| 2017/0352027 A1* | 12/2017 | Zhang | G06Q 20/065 |
| 2017/0366359 A1* | 12/2017 | Scarlata | H04L 9/14 |
| 2018/0150411 A1 | 5/2018 | Kou | |
| 2020/0259799 A1 | 8/2020 | Li | |

OTHER PUBLICATIONS

S. Johnson, et al., "Intel Software Guard Extensions: EPID Provisioning and Attestation Services", Mar. 9, 2016, retrieved from the Internet on Apr. 23, 2018, URL: https://software.intel.com/sites/default/files/managed/ac/40/2016%20WW10%20sgx%20provisioning%20and%20attestation%20final.pdf.

JP Aumasson, et al., "SGX Secure Enclaves in Practice: Security and Crypto Review", Jul. 28, 2016, retrieved from the Internet on Aug. 27, 2019, URL: https://www.blackhat.com/docs/us-16/materials/us-16-Aumasson-SGX-Secure-Enclaves-In-Practice-Security-And-Crypto-Review-wp.pdf.

T. Knauth, "Integrating Remote Attestation with Transport Layer Security", Jan. 17, 2018, retrieved from the Internet on Nov. 21, 2018, URL:https://arxiv.org/ftp.arxiv/papers/1801/1801.05863.pdf.

* cited by examiner

SECURE DISTRIBUTION OF DEVICE KEY SETS OVER A NETWORK

CROSS REFERENCE TO RELATED APPLICATIONS

This application is a continuation of U.S. patent application Ser. No. 16/358,821 filed Mar. 20, 2019, the contents of where is incorporated herein by reference.

BACKGROUND

Technical Field

The subject matter of the present disclosure relates generally to the protection of device key sets during distribution over a network using a protected software environment.

Related Art

A software video encryptor (SVE) uses a protected software environment such as an Intel® SGX Enclave to protect device key sets and secret algorithms that use the device key sets. However, due to anonymity requirements, such SVEs do not provide a list of unique chip identifications (IDs) or chip-unique keys that can be used in advance to bind each device key set to a specific chip.

Thus, it would be advantageous and an improvement over the relevant technology to provide an apparatus, a system, and/or a method that is capable of protecting device key sets using a protected software environment such as an Intel® SGX Enclave during distribution end-to-end in a network, while still being able to bind the device key sets to a specific chip in advance of delivery.

SUMMARY

Embodiments described in the present disclosure provide methods for distribution of device key sets. The methods include generating a provisioning request including a protected software environment public key in a protected software environment (PSE), and sending the provisioning request along with a PSE hash and a PSE signature to a quoting enclave of a client device to obtain a quote and an enhanced privacy ID (EPID) signature.

A quote in this context is a digital signature over the PSE hash, where the hash is a measurement of the PSE software and the digital signature is calculated using a non-unique EPID key identifying the particular PSE software platform and vendor. EPID is an Enhanced Privacy ID, which is Intel Corporation's recommended and publicly known and documented algorithm for attestation of a trusted system while preserving privacy.

Additionally, a method includes obtaining from a crypto hardware (CH) token (e.g., belonging to a user) a digital signature for the provisioning request (e.g., token signature) and a token certificate. The provisioning request, the quote, the EPID signature, the token signature, and the token certificate are combined using untrusted software of the client device to form a provisioning message.

In an embodiment described in the present disclosure, a method includes transmitting the provisioning message from the untrusted software to an attestation proxy server (APS) using a first network connection, and then transmitting the provisioning message along with an APS signature and an APS certificate from the APS to an online provisioning server (OPS) using a second network connection.

Additionally, the method include generating a provisioning response in the OPS including an encrypted device key set and delivering the provisioning response to the PSE. The PSE decrypts the encrypted device key set in the provisioning response to obtain the device key set, re-encrypts the device key set with a local chip-specific sealing key, and stores the re-encrypted device key set.

In an embodiment described in the present disclosure, the CH token is, for example, a universal serial bus (USB) token and password protected such that the CH token provides the token signature and the token certificate after receiving a valid password. In this embodiment, the untrusted software transmits the PSE hash to the CH token and receives an authenticator object that includes the PSE hash signed using the token signature, requests and receives the token certificate, and attaches the authenticator object and the token certificate to the provisioning request and generates the provisioning message.

The APS verifies the signature of the authenticator object and then attaches the APS signature and the APS certificate to the provisioning message based on a verification result. In this embodiment, the method also includes, in the OPS, verifying the token signature and the token certificate.

In an embodiment described in the present disclosure, a method includes generating a re-provisioning request for a new device key set in the PSE including the PSE hash signed using device credentials stored in the PSE as an authenticator object, and attaching the authenticator object to the re-provisioning request. The re-provisioning request, the quote, and the EPID signature are combined using the untrusted software to form a re-provisioning message.

In this embodiment, the APS verifies the signature of the authenticator object and then attaches the APS signature and the APS certificate to the re-provisioning message based on the verification result and transmits the re-provisioning request to the OPS to obtain the new device key set.

Embodiments described in the present disclosure provide an apparatus and a system for distribution of device key sets. The apparatus and system include a client device comprising the untrusted software, the quoting enclave, and the PSE for generating a provisioning request for a device key set.

Additionally, the APS receives the provisioning message using a first network connection, and transmits the provisioning message to the OPS using a second network connection. The OPS constructs a provisioning response including an encrypted device key set, and delivers the provisioning response to the PSE using the first and second network connections. The PSE decrypts the encrypted device key set in the provisioning response to obtain the device key set, re-encrypts the device key set with a local chip-specific key, and stores the re-encrypted device key set.

Embodiments described in the present disclosure provide a non-transitory computer-readable recording medium in each of the client device, the APS, the attestation server, and the OPS for distribution of device key sets. Each non-transitory computer-readable recording medium stores one or more programs which when executed by a respective processor performs the steps of the methods described above.

BRIEF DESCRIPTION OF THE DRAWINGS

In the drawings, like reference numbers generally indicate identical, functionally similar, and/or structurally similar elements.

DETAILED DESCRIPTION

Figure 1:
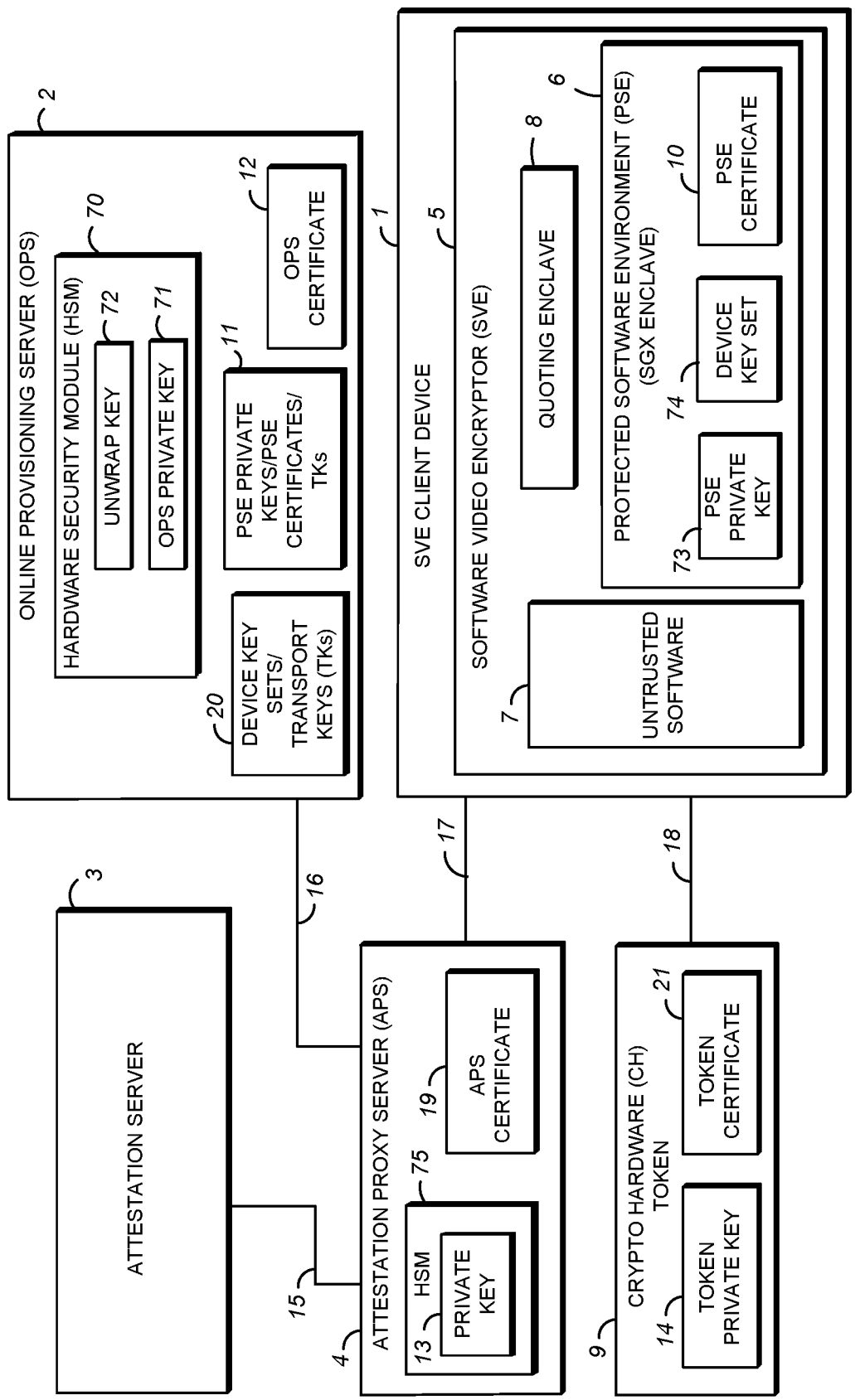
FIG. 1 is a schematic diagram of a system for distribution of device key sets according to an embodiment of the present disclosure.

FIG. 1 is a schematic diagram of a system for the distribution of device key sets. As shown in FIG. 1, the system includes a software video encryptor (SVE) device 1, an attestation proxy server (APS) 4, an attestation server 3, an online provisioning server (OPS) 2, and a crypto hardware (CH) token 9.

Figure 13:
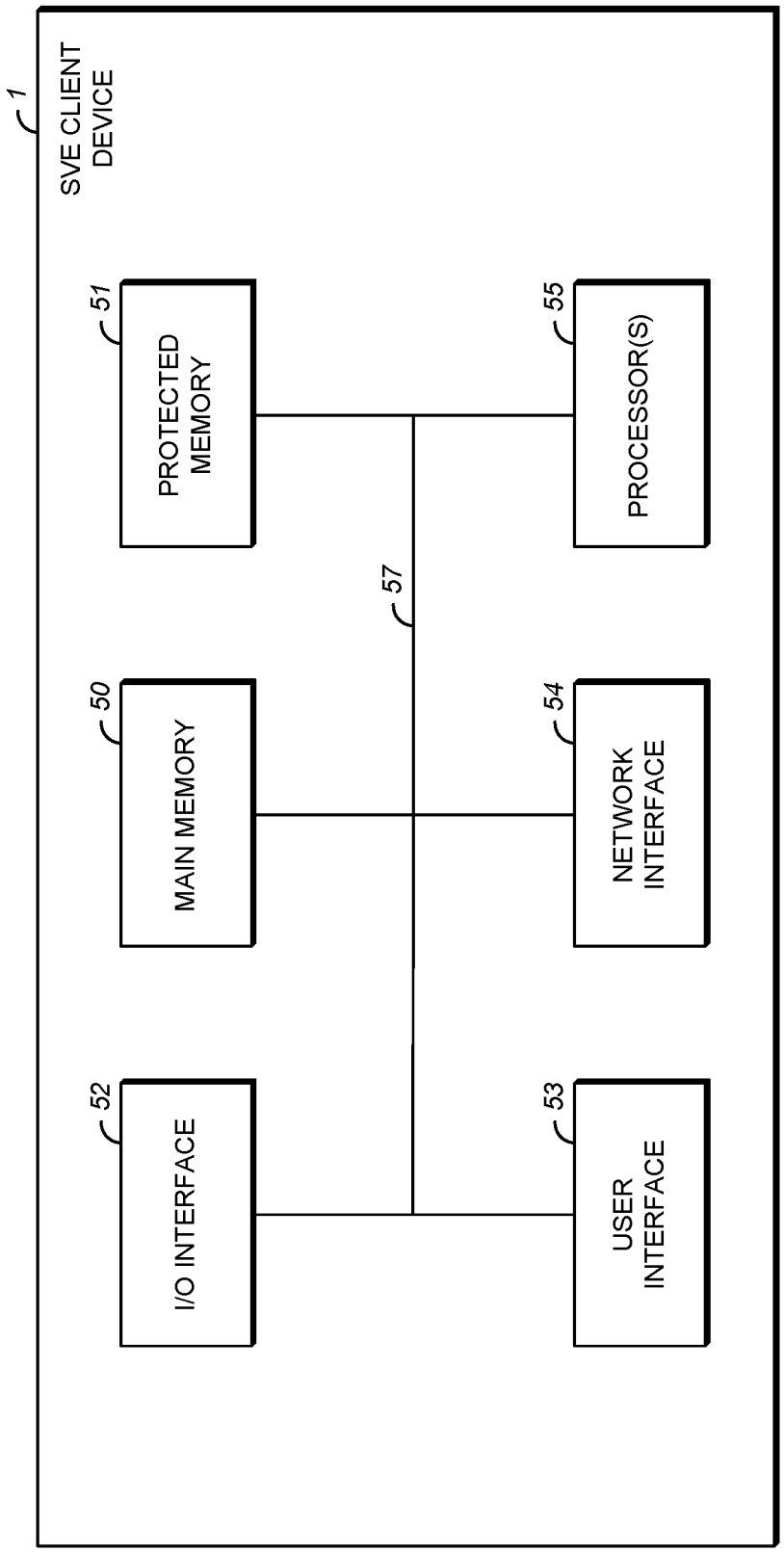
FIG. 13 is a schematic diagram of an exemplary client device according to an embodiment of the present disclosure.
Figure 14:
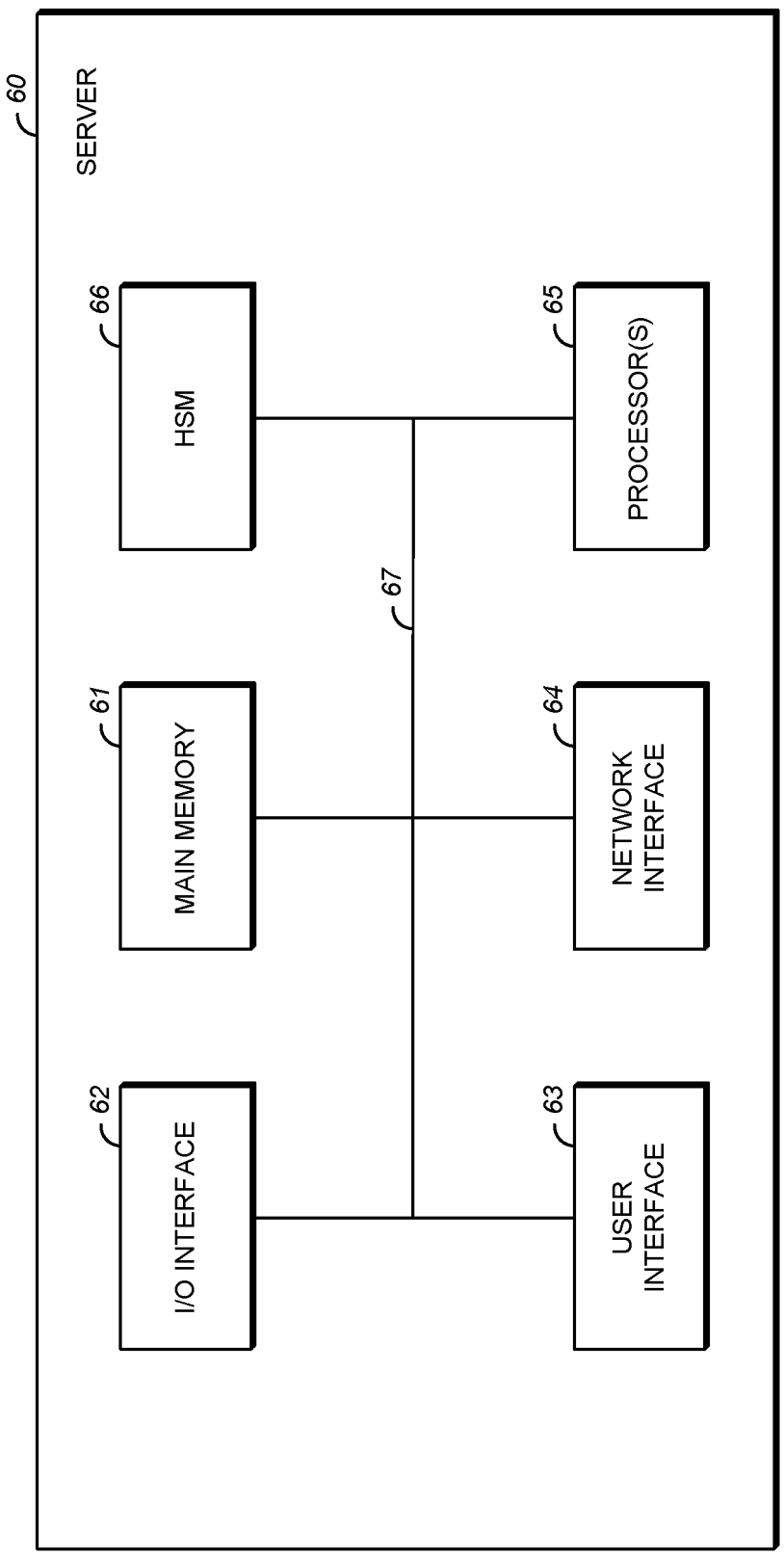
FIG. 14 is a schematic diagram of an exemplary server according to an embodiment of the present disclosure.

A description of the exemplary internal components of the SVE client device 1 and the servers 2, 3, 4 shown in FIG. 1 will be provided in the discussion of FIGS. 13 and 14. However, in general, it is contemplated by the present disclosure that the SVE device 1 and the servers 2, 3, 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing devices in the SVE client device 1 and the servers 2, 3, 4 may be adapted to execute any operating system, including Linux, UNIX, Windows Server, etc., as well as virtual machines adapted to virtualize execution of a particular operating system, including customized and proprietary operating systems. The SVE device 1 and the servers 2, 3, 4 are further equipped with components to facilitate communication with other computing devices over the one or more network connections 15, 16, 17. The network connections 15, 16, 17 include connections to local and wide area networks, wireless and wired networks, public and private networks, and any other communication network enabling communication in the system.

In FIG. 1, the SVE client device 1 is a personal computer, laptop, smartphone, tablet computer, personal digital assistant, set top box, in-vehicle computing systems, or other similar computing device. The SVE client device 1 includes one or more memories or memory locations for storing the software components of the SVE 5, which include untrusted software 7, a quoting enclave 8, and a protected software environment (PSE) 6. The one or more memories in the SVE 5 include, but are not limited to, random access memory (RAM), dynamic random access memory (DRAM), read only memory (ROM), logic blocks of a field programmable gate array (FPGA), erasable programmable read only memory (EPROM), and electrically erasable programmable ROM (EEPROM).

The untrusted software 7 facilitates communication with the PSE 6 and other components of the SVE client device 1 as well as communication between the PSE 6 and the network servers 2, 3, 4. The untrusted software 7 can be stored in non-volatile memory, RAM, or other similar memory in the SVE client device 1 maintained separate from the PSE 6. The quoting enclave 8 can also be stored in in non-volatile memory, RAM, or other similar memory in the SVE client device 1 maintained separate from the PSE 6. The quoting enclave 8 is implemented to verify reports or messages and returns a quote, which is a type of credential that can be verified. For example, the quoting enclave 8 verifies a report created by the PSE 6, and then converts and signs it using a device specific asymmetric key (i.e., Sig-EPID). The Sig-EPID can be an asymmetric signature with a device-specific EPID signing key similar to an Intel® EPID key.

Additionally, the quote can be a digital signature over the PSE hash, where the hash is a measurement of the PSE software and the digital signature is calculated using a non-unique EPID key identifying the particular PSE software platform and vendor. The EPID is an Enhanced Privacy ID, which is Intel Corporation's recommended and publicly known and documented algorithm for attestation of a trusted system while preserving privacy.

The PSE 6 is, for example, an Intel® SGX Enclave stored in a special protected memory region such as a processor reserved memory of DRAM of the SVE client device 1. The PSE 6 is a protected environment that contains code and data pertaining to a security-sensitive computation. The PSE 6 protects the confidentiality and integrity of computations performed inside the PSE 6 from attacks by malicious computing devices and/or software. The PSE 6 includes a PSE certificate 10, a PSE private key 73, and a device key set 74, which can be provisioned into the PSE 6 as described in the present disclosure. Once they are provisioned, a digital signature generated by the PSE private key 73 and the PSE certificate 10 can be attached to a message or a request generated (e.g., a provisioning request for a new device key set) to certify that it originated from the PSE 6.

The SVE client device 1 can include a user interface such as a keyboard, mouse, touchscreen display, or the like to allow a user to view and interact with the applications, tools, services, and other software of the SVE client device 1. While only one SVE client device 1 is shown, the present disclosure contemplates that more than one SVE client device 1 can be implemented.

The untrusted software 7 establishes communications with the APS 4 using a network connection 17. It is contemplated by the present disclosure that communications between the untrusted software 7 of the SVE client device 1 and the APS 4 via the network connection 17 are authenticated using, for example, a server authenticated transport layer security (TLS) to secure all communications between the APS 4 and the SVE client device 1. The APS 4 is a network server that provides verification that a message or data generated (e.g., provisioning request or re-provisioning request for a device key set) from the PSE 5 has not been modified after leaving the SVE client device 1. Verification by the APS 4 is provided by attaching its own signature and certificate using the private key 13 and APS certificate 19. As shown in FIG. 1, the private key 13 can be stored in a hardware security module (HSM) 75, which provides security as well as a secure environment for executing cryptographic operations in the APS 4. It is contemplated by the present disclosure that the HSM 75 can be implemented as a hardware element or implemented using software techniques such as white-box cryptography.

The attestation server 3 is a network server providing attestation services such as those provided by an Intel® Attestation Service. The attestation server 3 communicates with the APS 4 using a network connection 15. It is contemplated by the present disclosure that communications between the APS 4 and the attestation server 3 via network connection 15 are authenticated using, for example, mutually authenticated TLS to secure all communications between the APS 4 and the attestation server 3. The attestation server 3 provides verification of the information provided from the SVE client device 1 via the APS 4. For example, the quote from the quoting enclave 8 contains a processor's provisioned EPID signature, which can verified by the attestation server 3 and the results returned to the attestation proxy 4 using the network connection 15.

The online provisioning server (OPS) 2 is a network server that communicates with the attestation proxy server 3 using a network connection 16. It is contemplated by the present disclosure that communications between the attestation proxy server 4 and the online provisioning system 2 via network connection 16 are implemented using, for example, a transmission control protocol/Internet protocol (TCP/IP). As shown in FIG. 1, the OPS 2 stores device key sets 20, encrypted PSE private keys and corresponding PSE certificates 11, an OPS certificate 12, and a hardware security module (HSM) 70. It is contemplated by the present disclosure that the device key sets 20 are stored in encrypted form with corresponding random and unique transport keys (TKs) in an OPS database along with the PSE private keys (e.g., also encrypted with random and unique TKs), the corresponding PSE certificates 11, and other configurable parameters, which are retrieved from the OPS database by the OPS 2 when a request for a device key set (i.e., a provisioning request) is received.

It is also contemplated by the present disclosure that the HSM 70 can be implemented as a hardware element or implemented using software techniques such as white-box cryptography. The HSM 70 provides security for the OPS private key 71 and the unwrap key 72. Additionally, the HSM 70 provides a secure environment for executing cryptographic operations and generating temporary session keys.

The OPS 2 receives a provisioning request for a device key set from the APS 4 using the network connection 16. The provisioning request originates from the SVE client device 1 and is transmitted to the OPS 2 through the system after the verification and the authentication by other network servers 3, 4. The OPS 2 constructs a provisioning response by selecting the next available encrypted device key set 20 (i.e., encrypted by a corresponding TK) along with the corresponding encrypted TK, unwraps (i.e., decrypts inside the HSM 70) the TK with the unwrap key 72, then re-encrypts the TK using a one-time encryption key called a shared key generated inside the HSM 70 based on a key agreement algorithm such as Diffie-Hellman (DH) or Elliptic Curve Diffie-Hellman (ECDH). The provisioning response, including the encrypted device key set 20 and the re-encrypted TK, is transmitted along with an OPS signature (e.g., using the OPS private key 71) and the OPS certificate 12 of the OPS 2 back through the network to the SVE client device 1. The PSE 6 in the SVE client device 1 receives the provisioning response and decrypts the TK and the encrypted device key set (i.e., using the TK) to obtain the device key set 20. The PSE 6 re-encrypts the device key set with a local chip-specific key, and stores the re-encrypted device key set 74 for future use.

As shown in FIG. 1, prior to the SVE 5 being already provisioned with the PSE private key 73 and the PSE certificate 10, the SVE client device 1 initially includes the use of a crypto hardware (CH) token 9, such as for example a universal serial bus (USB) token. The CH token 9 is a physical electronic device used to prove a user's identity electronically. In this case, the CH token 9 is a cryptographic token using a token private key 14 and a token certificate 21. It is also contemplated by the present disclosure that the CH token 9 can be implemented with the use of a password or pin code to further enhance security.

The CH token is connected to the SVE client device 1 via an interface connection 18. The CH token 9 can be plugged into, for example, an input/output (I/O) interface such as a USB port of the SVE client device 1 using the interface connection 18. In this case, the CH token 9 can be either directly inserted or inserted via an extension cable to the SVE client device 1. It is also contemplated by the present disclosure that the interface connection 18 is a network connection similar to the other network connections 15, 16, 17 in the system such that the CH token can be connected to the SVE client device 1 after being properly authenticated. Additionally, the interface connection 18 can be a wired or a wireless connection. After use, the CH token 9 can be disconnected from the SVE client device 1 and carried to another location.

The SVE 5 may also request the PSE private key 73 and the PSE certificate 10, either in the same or separate provisioning request. When OPS 2 receives such a provisioning request, it finds the next available set of PSE credentials (e.g., PSE private key and PSE certificate) along with the corresponding encrypted TK, unwraps (i.e., decrypts inside the HSM 70) the TK with the unwrap key 71, then re-encrypts the TK using the one-time DH session key generated inside the HSM 70. The provisioning response including the encrypted PSE private key, PSE certificate and the re-encrypted TK is transmitted along with an OPS signature and the OPS certificate 12 of the OPS 2 back through the network to the SVE client device 1.

Figure 2:
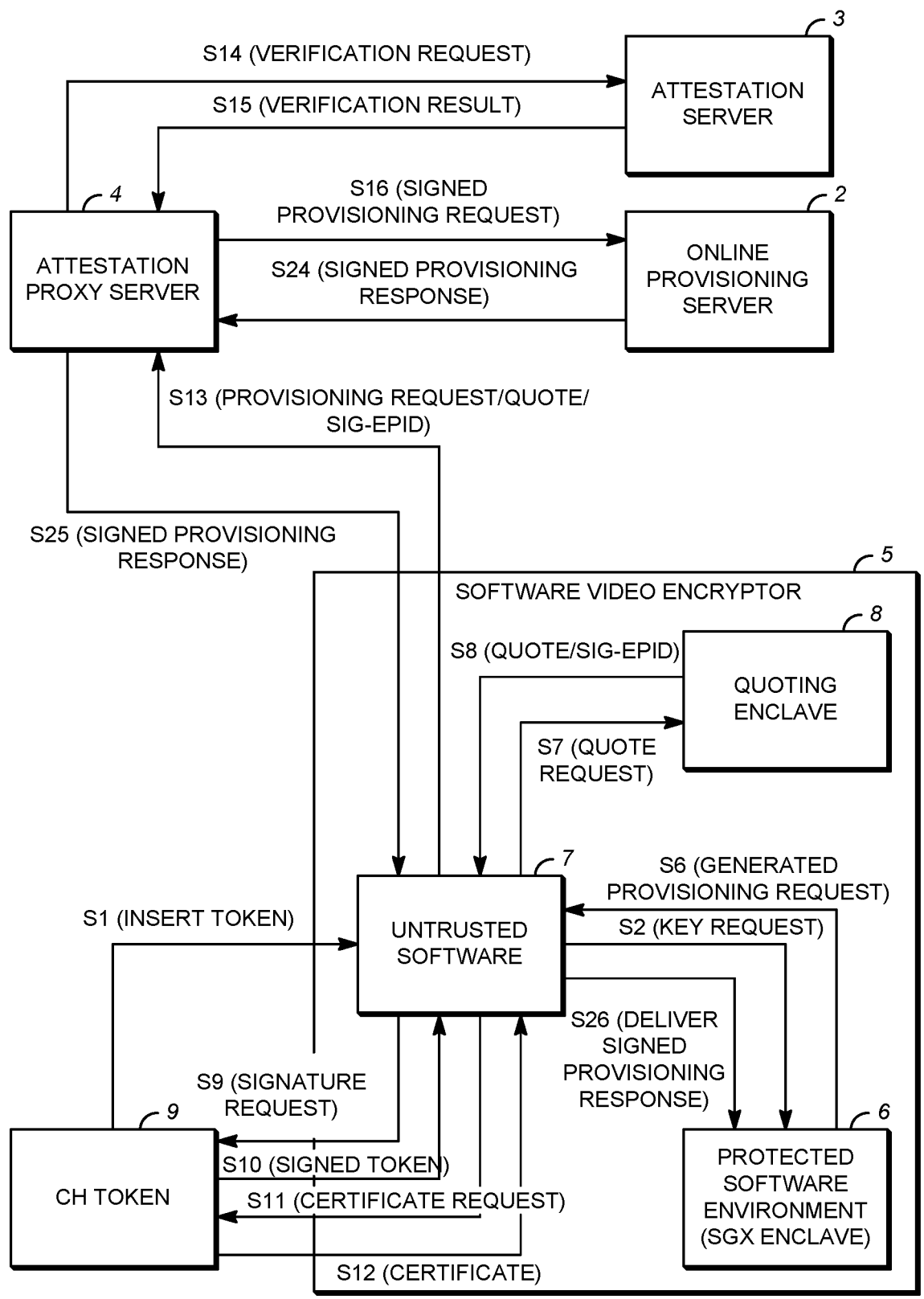
FIG. 2 illustrates a method for distribution of device key sets using the system of FIG. 1 according to an embodiment of the present disclosure.

FIG. 2 illustrates a method for the distribution of device key sets using the system of FIG. 1.

In step S1, the CH token 9 is connected (e.g., wired or wirelessly) to the SVE client device 1 and a user of the CH token 9 enters a token password or pin code to active the CH token 9. As an alternative to the use of a password or pin code implemented as part of the CH token, the password or pin code can be stored in the SVE client device 1 and protected using encryption or obfuscation.

Figure 3:
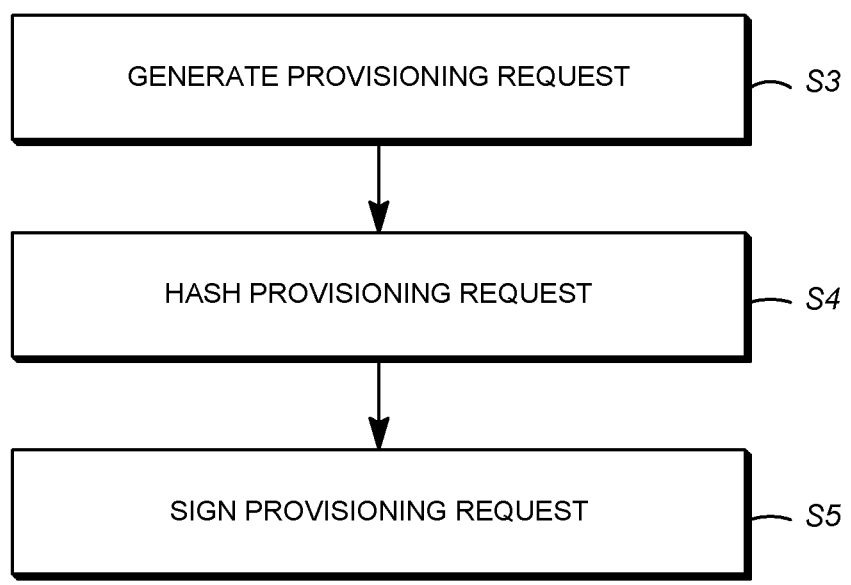
FIG. 3 illustrates a method performed by the protected software environment for generating the provisioning request according to an embodiment of the present disclosure.

Once the CH token 9 is authenticated and granted access, the untrusted software 7 sends a request to the PSE 6 for the generation of a request for a device key set or provisioning request. The request by the PSE 6 includes target information for the quoting enclave 8. The generation of the provisioning request by the PSE 6 is described with reference to FIG. 3 and steps S3-S5. In step S3, the PSE 6 generates the provisioning request (e.g., ProvisioningRequest) that includes its PSE key agreement public key (DHc) (e.g., Diffie-Hellman (DH) key agreement). As an alternative, an Elliptic Curve DH (ECDH) key agreement can be implemented. In step S4, the PSE 6 hashes the provisioning request and, in step S5, this hash (i.e., report) is signed using an attestation quoting mechanism of the PSE 6, which proves that the software is executed inside the PSE 6. The signature of the PSE 6 in step S5 is also referred to as a Sig-Enclave. The Sig-Enclave is generated using a chip-specific symmetric sealing key using, for example, an EGETKEY instruction as implemented on an Intel® SGX Enclave.

Returning to FIG. 2, in step S6, the provisioning request, the report, and the Sig-Enclave are all sent from the PSE 6 to the untrusted software 7. The provisioning request, the report, and the Sig-Enclave cannot be modified because the Sig-Enclave can only be generated with a secret key inside the PSE 6 and is used to validate the provisioning request and the report. In step S7, the untrusted software 7 sends the report and Sig-Enclave to the quoting enclave 8 for the generation of a quote. The quoting enclave 8 verifies the report created by the PSE 6, and then converts and signs it using a device specific asymmetric key (i.e., Sig-EPID). The Sig-EPID is an asymmetric signature with a device-specific EPID signing key similar to an Intel® EPID key. The output of this process is the quote, which can be verified by the attestation server 3. In step S8, the quoting enclave 8 returns the quote and a Sig-EPID to the untrusted software 7.

Additionally, the quote can also be a digital signature over the PSE hash, where the hash is a measurement of the PSE software and the digital signature is calculated using a non-unique EPID key identifying the particular PSE software platform and vendor. The EPID is an Enhanced Privacy ID, which is Intel Corporation's recommended and publicly known and documented algorithm for attestation of a trusted system while preserving privacy.

In step S9, the untrusted software 7 sends the hash of the provisioning request to the CH token 9 and requests the signature of the CH token 9. The CH token 9 signs the hash using a token key 14 and returns the token signature (i.e., Sig-Token) as an authenticator object to the untrusted software in step S10. The Sig-Token proves that an authorized user is making the provisioning request for a device key set. In step S11, the untrusted software 7 sends a request to the CH token 9 for its certificate 21 (i.e., token certificate), and the CH token 9 returns the token certificate 21 to the untrusted software 7 in step S12. The untrusted software 7 attaches the Sig-Token and the token certificate 21 to the provisioning request and combines the provisioning request, the quote, and the Sig-EPID to form a provisioning message.

In step S13, the provisioning message is transmitted to the APS 4 using the network connection 17 and, in step S14, the APS 4 transmits the quote and Sig-EPID of the provisioning message to the attestation server 3 using network connection 15 for verification or attestation services such as those provided by an Intel® Attestation Service.

The attestation server 3 verifies the Sig-EPID generated by the quoting enclave and sends a verification result to the APS 4 in step S15. After receiving the verification result, the APS 4 verifies the hash in the authenticator object (i.e., Sig-Token) of the provisioning message, attaches its signature using its private key 13 (i.e., APS signature) and its certificate 19 (i.e., APS certificate), and sends the provisioning message to the OPS 2 in step S16. The verification of the hash in the authenticator objects proves that the provisioning message was not modified since it left the SVE client device 1. Additionally, the APS signature and APS certificate prove that the APS 4 verifies that the provisioning message originated from the PSE 6 of the SVE client device 1, and that the Sig-Token and provisioning message have not been modified.

Figure 4:
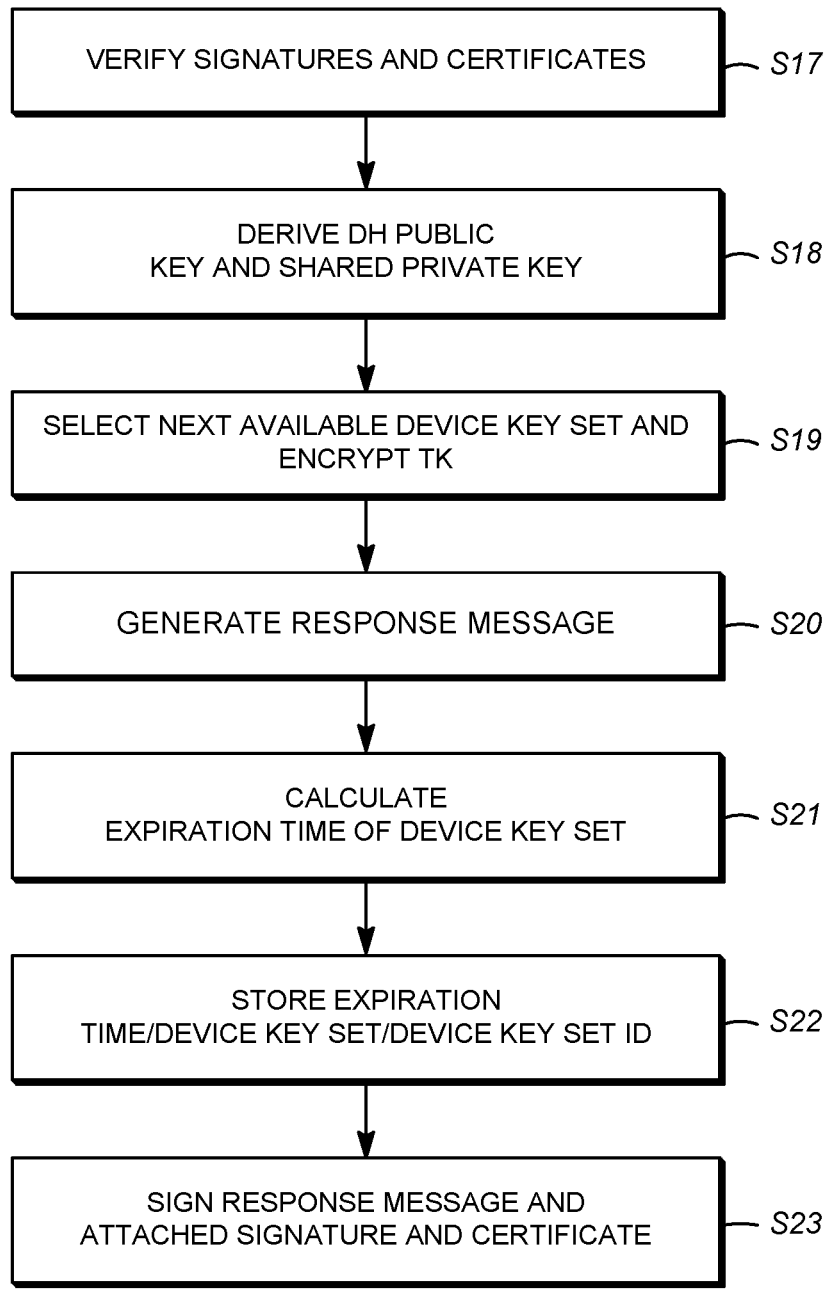
FIG. 4 illustrates a method performed by the online provisioning server after receiving the provisioning request according to an embodiment of the present disclosure.

The operations performed by the OPS 2 after receiving the provisioning message are described with reference to FIG. 4 and steps S17-S23. Upon receiving the provisioning message, the OPS 2 verifies the Sig-Token and token certificate 21, and verifies the APS signature and the APS certificate in step S17. These verifications by the OPS 2 ensure that the provisioning request for the device key set originated from an authentic PSE 6 in the SVE client device 1 and also by an authorized user of the SVE client device 1. In step S18, the OPS 2 derives its own DH public key (i.e., OPS key agreement public key) and a shared DH key. In step S19, the OPS 2 selects the next available (i.e., unbound) encrypted device key set 20 (i.e., encrypted by a corresponding transport key (TK)), and encrypts its corresponding TK with the shared DH key for delivery to the PSE 6 of the SVE client device 1.

In this case, the term "unbound" refers to an encrypted device key set retrieved from the OPS database by the OPS 2 that is not assigned, given out, or otherwise bound to an enclave. Additionally, it is contemplated by the present disclosure that the TK is first unwrapped (i.e., decrypted) inside the HSM 70 using the unwrap key 72 (e.g., AES key) and then wrapped (i.e., encrypted) inside the HSM 70 using the shared DH key so that the TK is never in the clear in the OPS 2. The wrapping and unwrapping of the TK is also discussed with reference to FIG. 12.

In step S20, the OPS 2 generates a provisioning response that includes the OPS public and the encrypted device key set. In step S21, the OPS 2 calculates an expiration time for use of the device key set based on the following formula: KeyExp=CHToken−Timestamp+KeyLifetime. In step S22, the expiration time can be stored along with the device key set and ID of the device key set in an OPS database of the OPS system. It is contemplated by the present disclosure that the expiration time can also be bundled with the device key set (e.g., included in an accompanying x.509 certificate) in the provisioning response. In some instances, a device key set may not require an expiration time and therefore calculation of an expiration time would not be necessary. However, when an expiration time for a device key set is calculated, the expiration time can be stored and used at a later time to create a report or take some additional actions. In step S23, the OPS 2 signs the provisioning response using its private key (i.e., OPS signature) and attaches the OPS signature and the OPS certificate 12.

Figure 5:
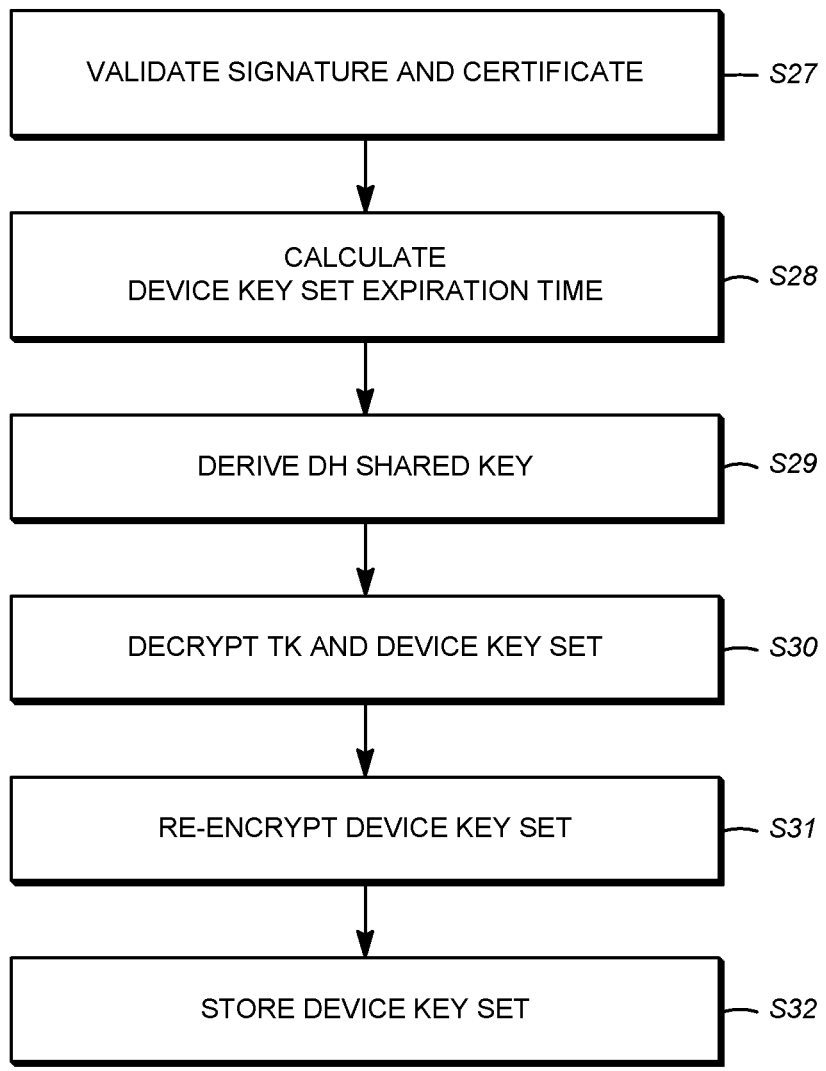
FIG. 5 illustrates a method performed by the protected software environment after receiving the provisioning response according to an embodiment of the present disclosure.
Figure 6:
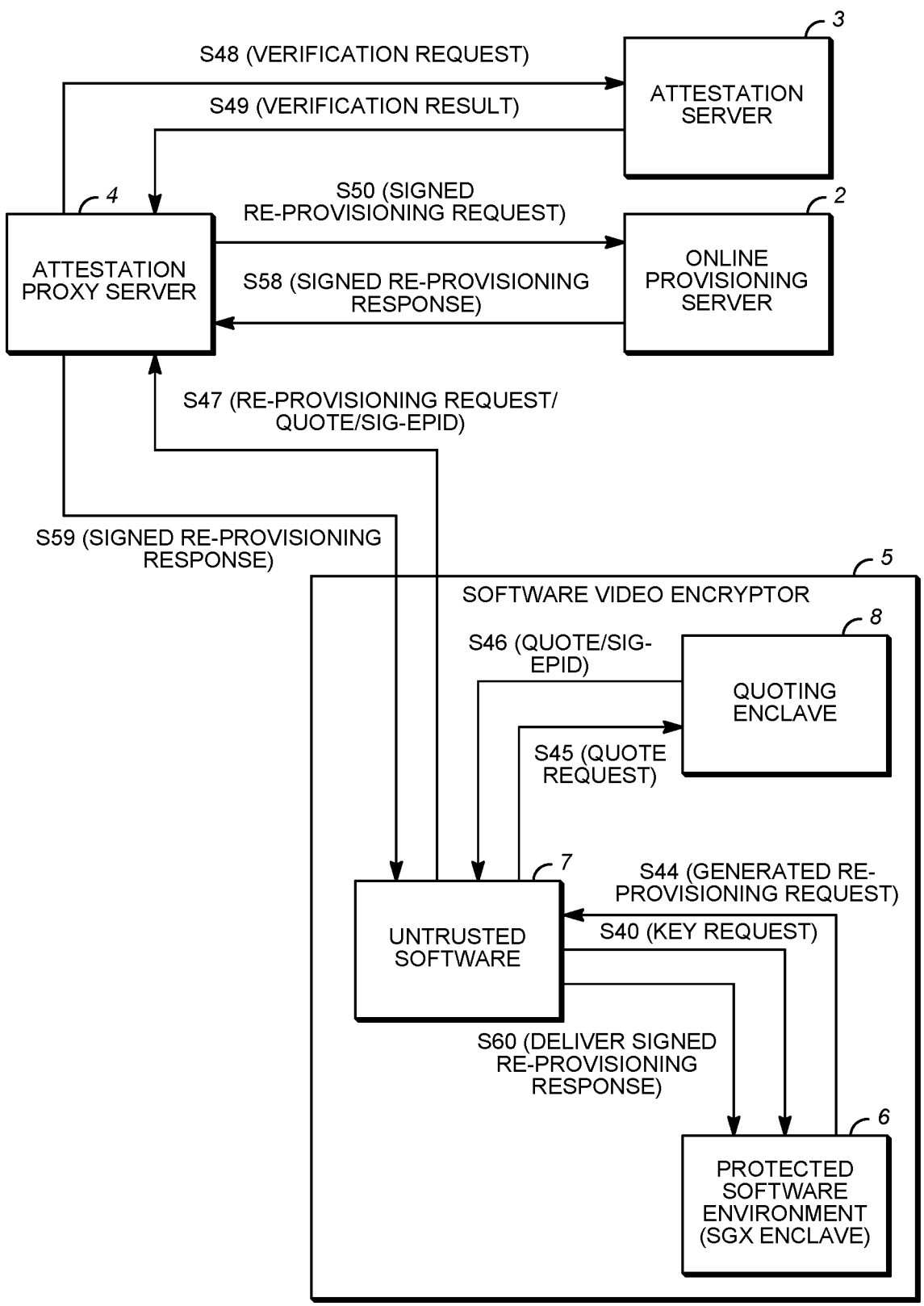
FIG. 6 illustrates a method for distribution of device key sets that are replacing current expiring device key sets using the system of FIG. 1 according to an embodiment of the present disclosure.
Figure 7:
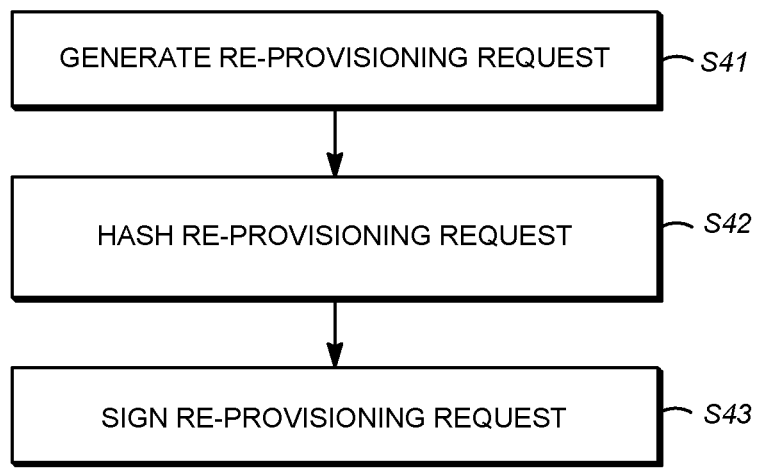
FIG. 7 illustrates a method performed by the protected software environment for generating the re-provisioning request according to an embodiment of the present disclosure.

Returning to FIG. 2, the OPS 2 transmits the provisioning response to the APS 4 using network connection 16 in step S24, and the APS 4 transmits the provisioning response to the untrusted software 7 of the SVE client device 1 in step S25. In step S26, the untrusted software 7 sends the provisioning response to the PSE 6. The operations performed by the PSE 6 after receiving the provisioning response is described with reference to FIG. 5 and steps S27-S32. After receiving the provisioning response, the PSE 6 validates the OPS signature and the OPS certificate in the provisioning response in step S27, and calculates the expiration time for use of the device key set in step S28. The expiration time is calculated using the following formula: KeyExp=CHToken−Timestamp+KeyLifetime. The expiration time calculated by the PSE 6 should correspond to the expiration time calculated by the OPS 2. In step S29, the PSE 6 derives the shared DH key and decrypts the TK, which is then used to decrypt the encrypted device key set in the provisioning response in step S30. In step S31, the PSE 6 re-encrypts the device key set using a local chip-specific sealing key, and stores it in the PSE 6 in step S32.

The system and methods described in FIGS. 1-5 allow the provisioning of a device key set using a CH token 9 controlled by an authorized user. On the other hand, FIGS. 6-9 describe methods that allow re-provisioning of a new device key set (e.g., a second device key set) using device credentials or PSE credentials (e.g., PSE private key 73 and PSE certificate 10) stored in the PSE 6 in lieu of a CH token 9 using the system of FIG. 1.

For example, it is contemplated by the present disclosure that in step S24 (i.e., signed provisioning response), the device key set returned by the OPS 2 to the APS 4 can optionally include, inside the device key set, a PSE private key and a PSE certificate. In this case, when the provisioning response is received by the PSE 6 in step S26, the PSE 6 will extract the PSE private key and the PSE certificate, decrypt the PSE private key, re-encrypt the PSE private key with a local sealing key, and store the re-encrypted PSE private key. After the above process, a new device key set or a second device key set (i.e., re-provisioning request) can be automatically performed without the need to implement the CH token and manual user interaction (e.g., connecting the CH token and entering a password or pin code).

As shown in FIG. 1, the PSE 6 includes a PSE private key 73 and a PSE certificate 10, which constitute the device credentials or PSE credentials. It is contemplated by the present disclosure that the device credentials can be "PKI-based" including a device unique private key and x.509 certificate, or can be a symmetric key or be "password-based." As noted above, with the device credentials (e.g., PSE private key 73 and a PSE certificate 10) in the PSE 6, the SVE 5 of the SVE client device 1 can request a new device key set or a second device key set (i.e., re-provisioning request) without the need for the CH token 9.

Returning to FIG. 6, in step S40, the untrusted software 7 sends a request to the PSE 6 for the generation of a new device key set or re-provisioning request. The request by the PSE 6 also includes target information for the quoting enclave 8. The generation of the re-provisioning request by the PSE 6 is described with reference to FIG. 7 and steps S41-S43. In step S41, the PSE 6 generates the re-provisioning request (e.g., Re-ProvisioningRequest) that includes an authenticator object and its PSE key agreement public key (DHc) (e.g., Diffie-Hellman (DH) key agreement). As an alternative to the DH key agreement, an Elliptic Curve DH (ECDH) key agreement can be implemented.

In this embodiment of the present disclosure, the authenticator object is signed using the device credentials (e.g., PSE private key 73 and a PSE certificate 10) in the PSE 6. On the other hand, in the embodiment described in FIGS. 2-5, the authenticator object is signed using the Sig-Token. In step S42, the PSE 6 hashes the re-provisioning request and, in step S43, this hash (i.e., report) is signed using an attestation quoting mechanism of the PSE 6, which proves that the software is executing inside the PSE 6. The signature of the PSE 6 in step S43 is also referred to as a Sig-Enclave. The Sig-Enclave is generated using a chip-specific symmetric sealing key using, for example, an EGETKEY instruction, as implemented on an Intel® SGX Enclave.

Returning to FIG. 6, in step S44, the re-provisioning request, the report, and the Sig-Enclave are all sent from the PSE 6 to the untrusted software 7. The re-provisioning request, the report, and the Sig-Enclave cannot be modified because the Sig-Enclave can only be generated with a secret key inside the PSE 6 and is used to validate the provisioning request and the report. In step S45, the untrusted software 7 sends the report and Sig-Enclave to the quoting enclave 8 for the generation of a quote. The quoting enclave verifies the report created by the PSE 6, and then converts and signs it using a device specific asymmetric key (i.e., Sig-EPID). The Sig-EPID is an asymmetric signature with a device-specific EPID signing key similar to an Intel® EPID key. The output of this process is the quote, which can be verified by the attestation server 4.

Additionally, the quote can also be a digital signature over the PSE hash, where the hash is a measurement of the PSE software and the digital signature is calculated using a non-unique EPID key identifying the particular PSE software platform and vendor. The EPID is an Enhanced Privacy ID, which is Intel Corporation's recommended and publicly known and documented algorithm for attestation of a trusted system while preserving privacy.

In step S46, the quoting enclave 8 returns the quote and a Sig-EPID to the untrusted software 7. In step S47, the untrusted software combines the re-provisioning request, the quote, and the Sig-EPID to form a re-provisioning message and the re-provisioning message is transmitted from the untrusted software 7 of the SVE client device 1 to the APS 4 using the network connection 17. In step S48, the APS 4 transmits the quote and Sig-EPID of the re-provisioning message to the attestation server 3 using network connection 15 for verification or attestation services such as those provided by an Intel® Attestation Service.

The attestation server 3 verifies the Sig-EPID generated by the quoting enclave, and sends a verification result to the APS 4 in step S49. After receiving the verification result, the APS 4 verifies the hash in the authenticator object (i.e., signed using device credentials) of the re-provisioning message, attaches its signature using its private key 13 (i.e., APS signature) and its certificate 19 (i.e., APS certificate), and sends the re-provisioning message to the OPS 2 in step S50. The verification of the hash in the authenticator objects proves that the re-provisioning message was not modified since it left the SVE client device 1. Additionally, the APS signature and APS certificate prove that the APS 4 verifies that the re-provisioning message originated from the PSE 6 of the SVE client device 1 and that the Sig-Token and re-provisioning message have not been modified.

Figure 8:
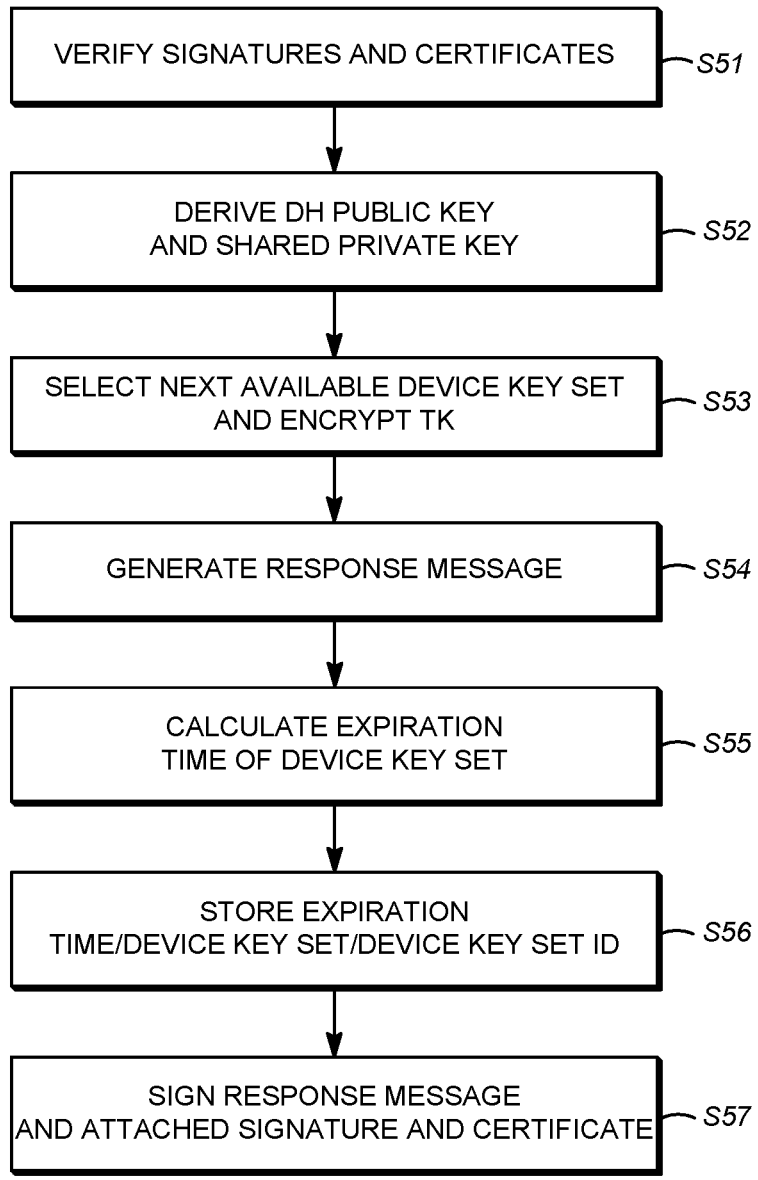
FIG. 8 illustrates a method performed by the online provisioning server after receiving the re-provisioning request according to an embodiment of the present disclosure.
Figure 9:
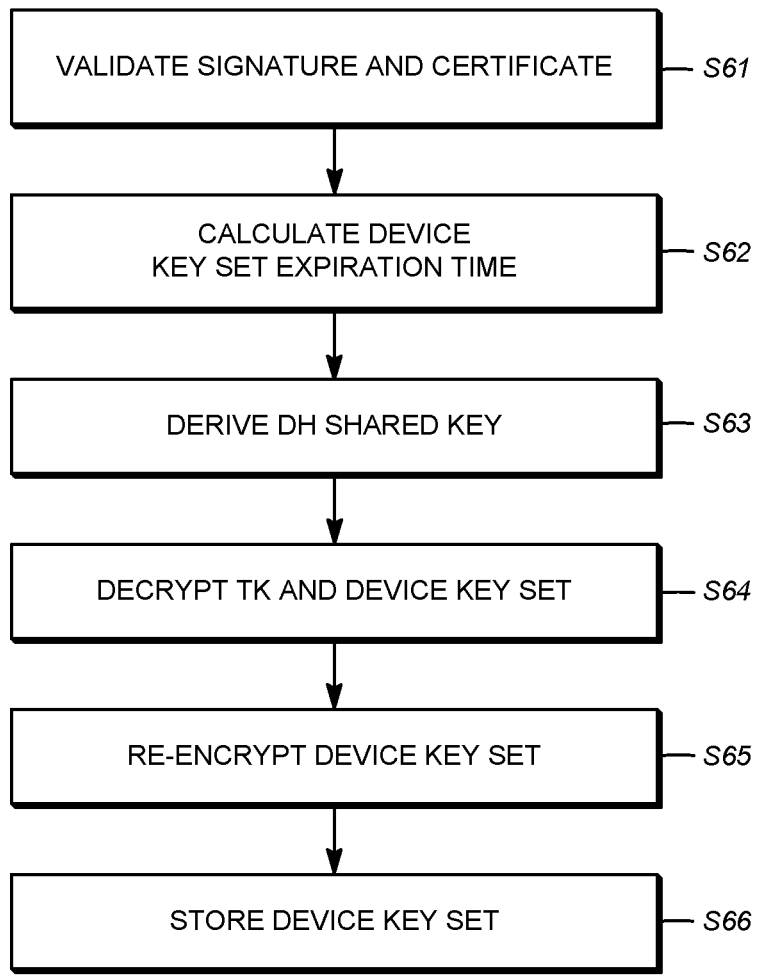
FIG. 9 illustrates a method performed by the protected software environment after receiving the re-provisioning response according to an embodiment of the present disclosure.

The operations performed by the OPS 2 after receiving the re-provisioning message are described with reference to FIG. 8 and steps S51-S57. Upon receiving the re-provisioning message, the OPS 2 verifies the signature of the authenticator object (i.e., signed using device credentials) and verifies the APS signature and the APS certificate in step S51. These verifications by the OPS 2 ensure that the re-provisioning message for the device key set originated from an authentic PSE 6 in the SVE client device 1 having valid device credentials. In step S52, the OPS 2 derives its own DH public key (i.e., OPS key agreement public key) and a shared DH key. In step S53, the OPS 2 selects the next available (i.e., unbound) encrypted device key set 20 (i.e., encrypted with a corresponding transport key (TK)), and encrypts its corresponding TK using the shared DH key for delivery to the PSE 6 of the SVE client device 1.

In this case, the term "unbound" refers to an encrypted device key set retrieved from the OPS database by the OPS 2 that is not assigned, given out, or otherwise bound to an enclave. Additionally, it is contemplated by the present disclosure that the TK is first unwrapped (i.e., decrypted) inside the HSM 70 using the unwrap key 72 (e.g., AES key) and then wrapped (i.e., encrypted in the HSM 70) using the shared DH key so that the TK is never in the clear in the OPS 2. The wrapping and unwrapping of the TK is also discussed with reference to FIG. 12.

In step S54, the OPS 2 generates a re-provisioning response that includes the OPS public and the encrypted device key set (along with the encrypted TK). In step S55, the OPS calculates an expiration time for use of the device key set based on the following formula: KeyExp=CHToken−Timestamp+KeyLifetime. In step S56, the expiration time can be stored along with the device key set and ID of the device key set in an OPS database of the OPS system. It is contemplated by the present disclosure that the expiration time can also be bundled with the device key set (e.g., included in an accompanying x.509 certificate) in the re-provisioning response. In some instances, a device key set may not require an expiration time and therefore calculation of an expiration time would not be necessary. However, in the case that an expiration time is calculated, the expiration time can be used at a later time to create a report or take some additional actions. In step S57, the OPS 2 signs the re-provisioning response using its private key (i.e., OPS signature) and attaches the OPS signature (e.g., using the OPS private key 71 and OPS certificate 12).

Returning to FIG. 6, the OPS 2 transmits the re-provisioning response to the APS 4 using network connection 16 in step S58, and the APS 4 transmits the re-provisioning response to the untrusted software 7 of the SVE client device 1 in step S59 using network connection 17. In steps S60, the untrusted software 7 sends the re-provisioning response to the PSE 6. The operations performed by the PSE 6 after receiving the re-provisioning response is described with reference to FIG. 9 and steps S61-S66.

After receiving the re-provisioning response, the PSE 6 validates the OPS signature and the OPS certificate in the re-provisioning response in step S61, and calculates the expiration time for use of the device key set in step S62. The expiration time is calculated using the following formula: KeyExp=CHToken−Timestamp+KeyLifetime. The expiration time calculated by the PSE 6 should correspond to the expiration time calculated by the OPS 2. In step S63, the PSE 6 derives the shared DH key and decrypts the TK, which is then used to decrypt the encrypted device key set in the re-provisioning response in step S64. In step S65, the PSE 6 re-encrypts the device key set using a local chip-specific sealing key, and stores it in the PSE 6 in step S66.

Figure 10:
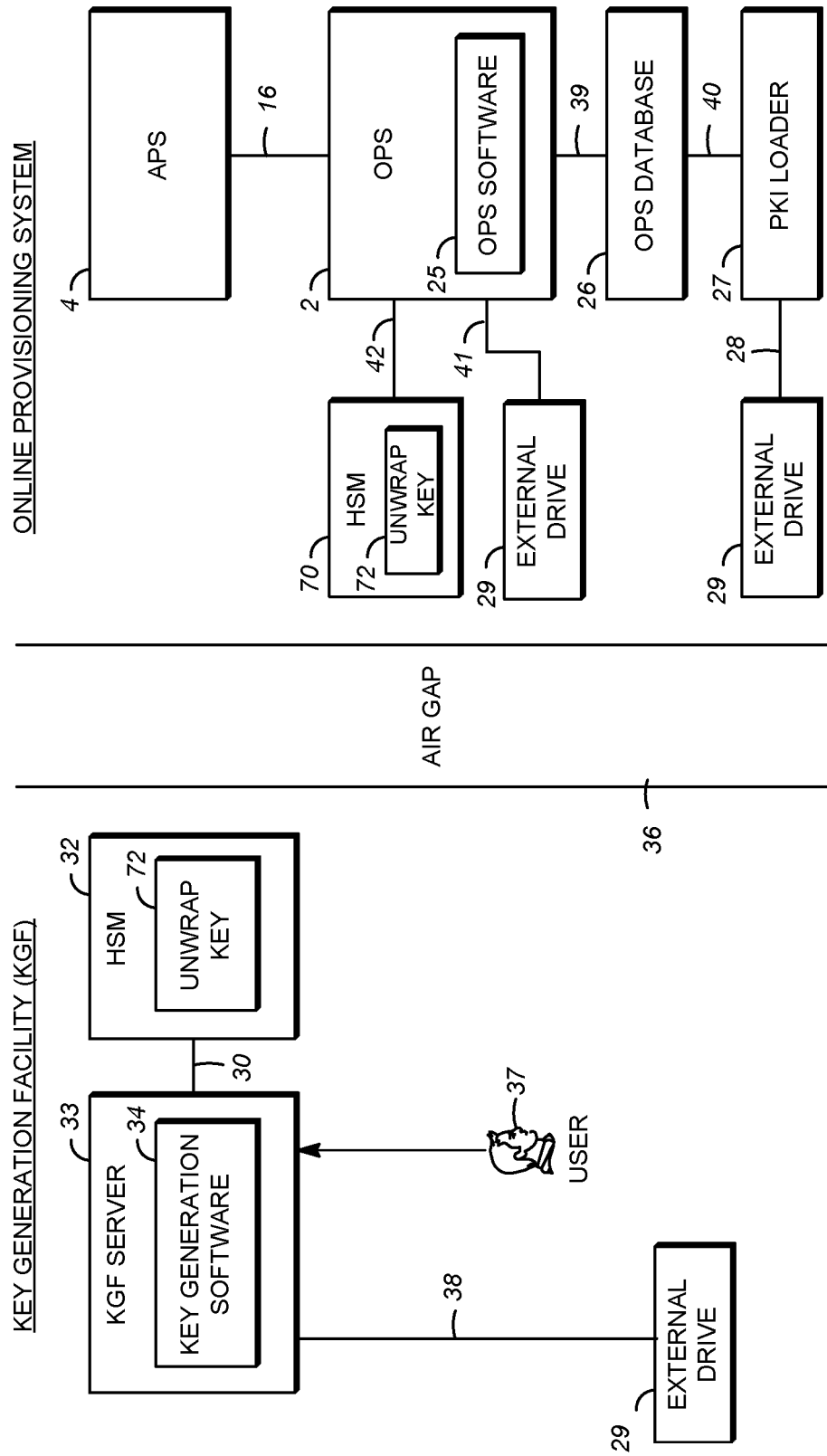
FIG. 10 is a system drawing of the key generation facility used to periodically generated device key sets that are loaded to the online provisioning system.

FIG. 10 is a system drawing of the key generation facility used to periodically generate device key sets that are loaded to the online provisioning system.

As shown on the left side of FIG. 10, a key generation facility (KGF) includes a KGF server 33 storing key generation software 34 in communication with a hardware security module (HSM) 32 using connection 30. It is contemplated by the present disclosure that the connection 30 is a wired or wireless connection. The KGF using its key generation software 34 periodically generates device key sets and encryption keys in the KGF server 33. The KGF creates the device key sets and the encryption keys through the use of a cryptographically secure random bit generator and stores them, along with all their attributes in the KGF server 34 and/or HSM 32. The KGF server 33 uses its key generation software 34 in an integrated approach for generating, distributing, and managing device key sets and cryptographic keys for devices and applications used in the system.

The HSM 32 is implemented in the KGF for providing physical security of the device key sets and the encryption keys. The HSM 32 is in the form of a plug-in card or an external device such as a server or other computing device that attaches directly to the KGF server 33 using the wireless or wired connection 30. As shown in FIG. 10, a global unwrap key 72 is generated by the key generation software 34 in a key generation ceremony is loaded to the HSM 32 of the KGF. The same unwrap key 72 is also loaded into the OPS HSM 70 as shown on FIG. 1.

A user 37 of the KGF can trigger the generation of a device key set and a corresponding encryption key (i.e., TK) via a user interface of the KGF server 33, and the generated and TK-encrypted device key set along with the TK encrypted with the unwrap key 72 can be stored on an external drive 29. The external drive 29 can be, but is not limited to, any external storage device such as a thumb drive, USB drive, hard drive, or other portable external storage device that is not part of the KGF server 33. The external drive 29 is plugged into, for example, an I/O interface of the KGF server 33 (e.g., a USB port) using the connection 38. The external drive 29 can be either directly inserted or inserted via an extension cable using connection 38. The external drive 29 can also be removed from the KGF server 33 after use and carried to another location.

Additionally, the key generation software 34 can be utilized to generate a PSE private key encrypted with the TK along with the matching PSE certificate. The generated and TK-encrypted PSE private key along with the PSE certificate and the TK encrypted with unwrap key 72 can be stored on an external drive 29.

On the right side of the FIG. 10, an exemplary configuration of an OPS system includes the APS 4, the OPS 2, the HSM 70, the OPS database 26, and a public key infrastructure (PKI) loader 27. The APS 4 is a network server communicating with the OPS 2 via network connection 16. As shown in FIG. 10, the OPS 2 includes OPS software 25 for performing operations associated with receiving provisioning and re-provisioning messages, and the generation and transmitting of provisioning and re-provisioning responses, as described in FIGS. 2-9. It is contemplated by the present disclosure that the OPS software 25 executes any operating system, including Linux, UNIX, Windows Server, etc., as well as virtual machines adapted to virtualize execution of a particular operating system, including customized and proprietary operating systems.

The OPS database 26 is a server, software module, or other similar computing device capable of receiving, storing, and managing device key sets, certificates, transport keys (TKs) and other encryption keys, and configurable parameters associated with assisting the OPS 2 in the generation and transmitting of provisioning and re-provisioning responses, as described with reference to FIGS. 2-9, via connection 39. Additionally, the OPS database 26 is configured to receive, store, and manage DH key parameters, certificate chain of the APS 4 signing the provisioning and re-provisioning requests, the maximum number of requests allowed for a single device, and expiration times for device key sets. It is contemplated by the present disclosure that the connection 39 between the OPS 2 and the OPS database 26 is a wireless or wired connection.

The OPS 2 also utilizes an HSM 70 similar to that of the KGF for providing physical security of the device key sets and encryption keys. The HSM 70 is in the form of a plug-in card or an external device such as a server or other computing device that attaches directly to the OPS 2 using a wireless or wired connection 42. It is also contemplated by the present disclosure that that HSM 70 can be included inside the OPS 2 similar to the HSM 70 described with reference to FIG. 1.

As shown in FIG. 10, the HSM 70 is utilized to store the unwrap key 72 generated by the key generation software 34 in a key generation ceremony and loaded to the HSM 70 of the OPS system using the external drive 29. The external drive 29 is plugged into, for example, an I/O interface of the OPS 2 (e.g., a USB port) using the connection 41 or plugged into, for example, an I/O interface of the PKI loader 27 (e.g., a USB port) using the connection 28. The external drive 29 can be either directly inserted or inserted via an extension cable using the connections 28, 41. It is contemplated by the present disclosure that the external drive 29 is used to store TK-encrypted device key sets along with the corresponding TKs encrypted with the unwrap key 72, as well as TK-encrypted PSE private keys along with the corresponding PSE certificates and TKs encrypted with the unwrap key 72 generated by the KGF, and then is removed from the KGF. The external drive 29 is carried to another location, and inserted into the OPS system to load all the data generated and encrypted in the KGF into the OPS database 26. As shown in FIG. 10, there is no direct electrical connection between the KGF and the OPS system, as indicated by the air gap 36. The PKI loader 27 is a server, module, or other physical computing device that facilitates the secure electronic transfer of information from the external drive 29 to the OPS database 26 using connection 40. It is contemplated by the present disclosure that the connection 40 between the OPS database 26 and the PKI loader 27 is a wireless or wired connection, which is additionally encrypted and secured using session-based security protocol such as TLS (Transport Layer Security).

Figure 11:
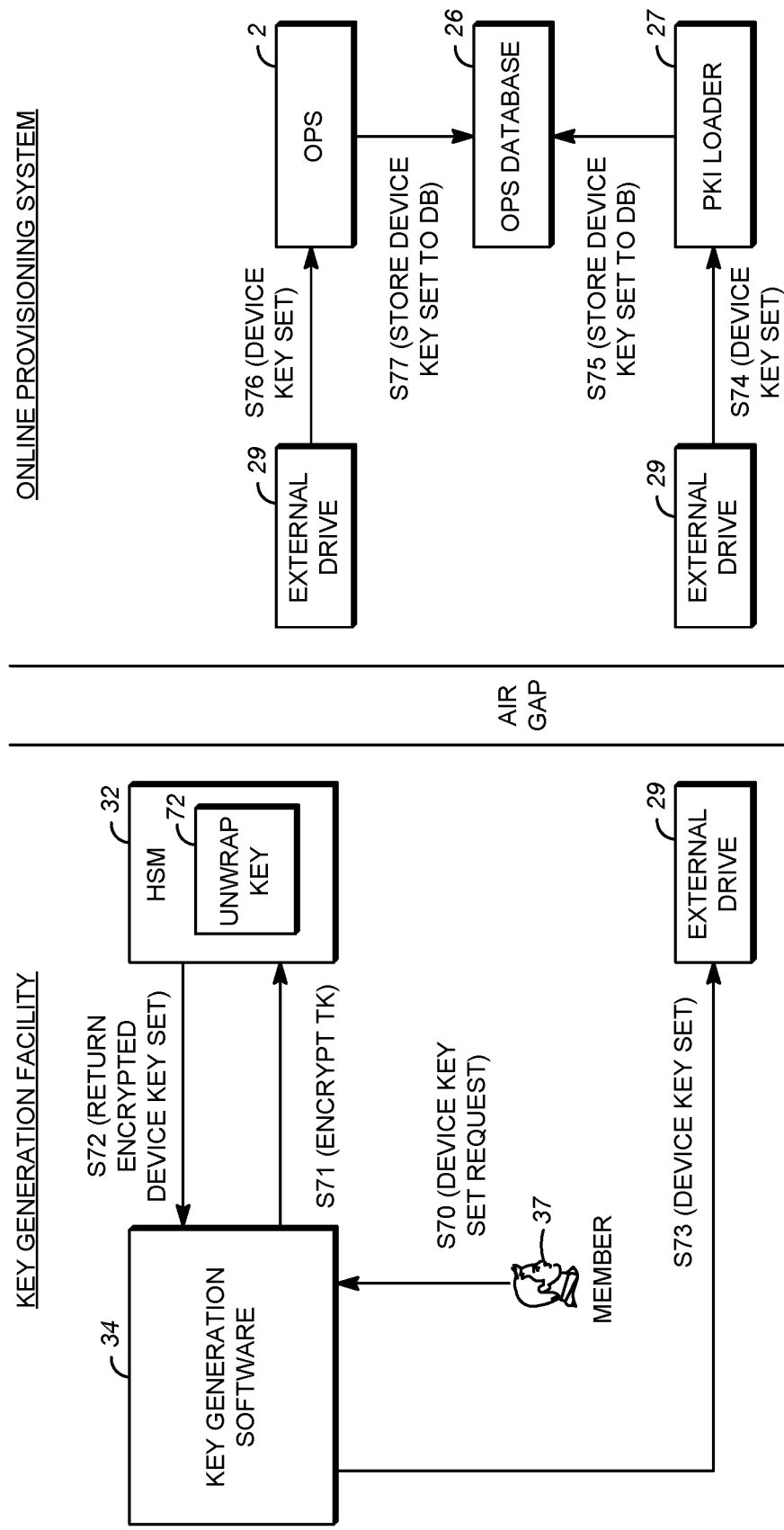
FIG. 11 illustrates methods performed by the key generation facility and the online provisioning system for loading the device key sets using the system of FIG. 10.

FIG. 11 illustrates methods performed by the KGF and the OPS system for loading the device key sets using the system of FIG. 10.

A method described in FIG. 11 is performed to periodically load the device key sets to the OPS 2 when, for example, the inventory of the device key sets in the OPS 2 is low. In step S70, the user 37 of the KGF initiates the generation of a device key using the user interface of the KGF server 33. A transport key (TK) is used to uniquely encrypt each device key set. The TK is a 128-bit key that is randomly generated by the KGF software 34. In step S71, during generation of the encrypted device key set, a new random TK is encrypted using, for example, the unwrap key 72 in the HSM 32. In general, it is not necessary to use the TK, and the device key set can be directly encrypted using the unwrap key 72. However, the use of the TK is a preferred implementation because it protects the device key sets from being exposed or being in the clear outside of the KGF. The HSMs 32, 70 of the KGF and OPS respectively are utilized to encrypt and decrypt the TK inside an HSM while not exposing clear device key sets and clear PSE private keys outside of the KGF.

In step S72, the encrypted TK and the encrypted device key set are returned to the KGF software 34, and the encrypted TK and the encrypted device key set, along with encrypted PSE private key and the corresponding PSE certificate and encrypted TK are stored by the KGF software 34 in the external drive 29 in step S73. In step S74, the external drive 29 can be used to load the encrypted TK and the encrypted device key set to the PKI loader 27 and then to the OPS database 26 in step S75. In the alternative, the external drive 29 can be used to load the encrypted TK and the encrypted device key sets, along with encrypted PSE private key and the corresponding PSE certificate and encrypted TK to the OPS 2 in step S76. The encrypted TK and the encrypted device key sets, along with encrypted PSE private key and the corresponding PSE certificate and encrypted TK can then be stored in the OPS database 26 in step S77. It is contemplated by the disclosure that the OPS 2 uses the HSM 70 for the encryption and the decryption of the TK, which protects the TK and the device key sets from being exposed or being in the clear.

Figure 12:
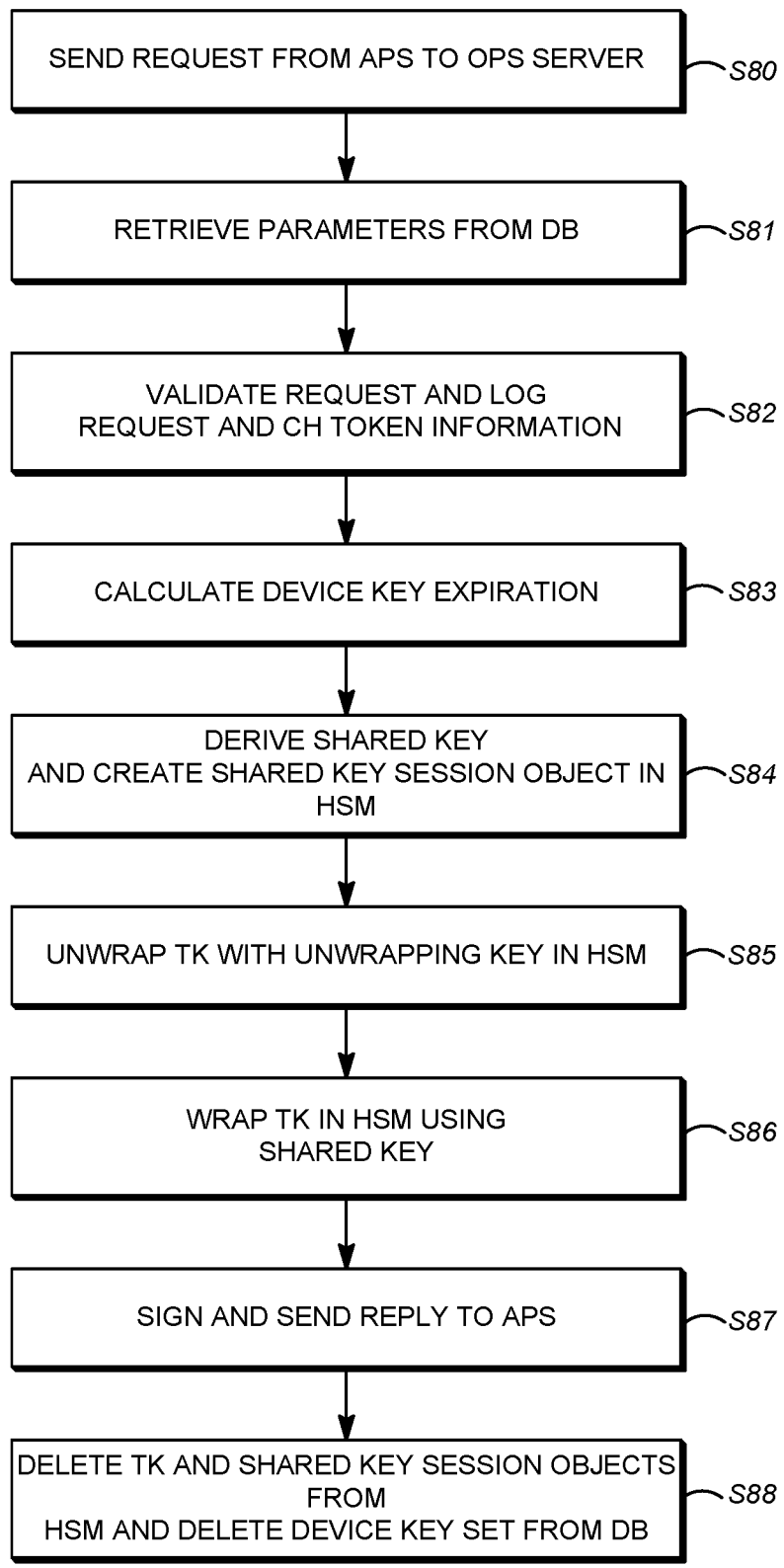
FIG. 12 illustrates a method performed by the online provisioning system for message handling when a provisioning request is received using the system of FIG. 10.

FIG. 12 illustrates a method performed by the OPS system for providing exemplary message handling when a provisioning request is received using the system of FIG. 11. In FIG. 12, it is assumed that when a provisioning request is received by the OPS 2, the OPS 2 verifies the APS signature, the APS certificate, the token certificate, and the token signature in the provisioning request. Additionally, it is assumed that each device key set and each PSE private key are uniquely encrypted with a TK, which is never exposed or in the clear.

In step S80, the provisioning request is sent from the APS 4 to the OPS 2 and, in step S81, the OPS 2 retrieves the configurable parameters from the OPS database 26 that correspond to the provisioning request received. The OPS database 26 is configured to receive, store, and manage DH key parameters and other encryption key parameters, available device key sets, certificate chain of the APS 4 signing the provisioning and re-provisioning requests, certificate chain of authenticated tokens of the SVE 5 in the provisioning request, the maximum number of requests allowed for a single device, and expiration times for device key sets sent in a provisioning response. In step S82, the OPS 2 validates APS signature and APS certificate, validates the token signature and the token certificate, and checks to verify that the maximum number of requests for the device ID for the device making the request have not been reached.

In step S83, the OPS 2 logs the request and token information (i.e., token certificate serial number and timestamp) and calculates the device key set expiration time. The logged timestamp and the associated device key set lifetime are used for the calculation of the expiration of the device key set, which is based on the formula: KeyExp=CHToken_Timestamp+KeyLifetime. In step S84, the OPS 2 derives a shared key based on the SVE key agreement public key in the provisioning request. A shared key session object is created in the HSM 70 with only a "wrap" attribute set in step S84. That is, the shared key object does not have an "encrypt," "decrypt," or "unwrap" attribute set. The key agreement algorithm utilized to generate the shared key may be for example Diffie-Hellman (DH) or Elliptic Curve Diffie-Hellman (ECDH).

In step S85, the OPS 2 uses the unwrap key 72 to unwrap (i.e., decrypt) the TK in the HSM 70 as a session object. In steps S86, the OPS 2 wraps the TK using the DHkey. The wrapping algorithm is, for example, AES-128-CBC-PAD with IV=0. It is contemplated by the present disclosure that all operations in steps S84-S86 take place inside the HSM 70 such that none of the keys are exposed or are in the clear. It is contemplated by the present disclosure that steps S85 and S86 may need to be repeated multiple times if the same provisioning request message had requested multiple types of keys such as for instances a device key set as well as PSE private key and PSE certificate. In step S87, the OPS 2 prepares the provisioning response (including the encrypted device key set and any other device keys that were requested such as encrypted PSE private key and PSE certificate), attaches the OPS signature and the OPS certificate, and responds to the provisioning request. The encrypted TK is included as part of the device key set. If additional keys were requested, each type of encrypted key (e.g., PSE private key) has an accompanying encrypted TK. After the provisioning response is transmitted from the OPS 2, the OPS 2 deletes the device key set, the TK, and the DHkey from the OPS database 26 in step S88 so that it cannot be used again (e.g., to avoid cloning). Any additional device-unique data that was transmitted by OPS 2 (e.g., PSE private key and PSE certificate along with the accompanying TK) is also deleted from the OPS database 26 in the same step S88.

For the device key set retrieved by a SVE client device 1, the OPS 2 generates an expiration time and stores the expiration time and saves it with the device key set in the OPS database 26. The same expiration time is calculated by and stored on the SVE client device 1 when it receives the device key set from the OPS 2. It is contemplated by the present disclosure that the SVE client device 1 receiving the device key set honors the calculated expiration time such that the device key set is not used after the calculated expiration time expires.

However, to ensure that an expired device key set can no longer be used, for example, to access any video content without requesting a new device key set from the OPS 2, it is contemplated by the present disclosure that the OPS 2 periodically generates a list of IDs of the device key sets that become expired. The OPS 2 then transmits the list of IDs for the expired device key sets to a Conditional Access System (CAS) Server (not shown). The CAS server is in a service provider's network connected to the system shown in FIG. 1 through a network connection. The CAS receives the list of expired IDs list, and revokes access to the IDs on the list by removing their digital content entitlements. The CAS includes a database that stores IDs and keys, and transmits entitlements for digital content to the PSE 6.

FIG. 13 is a schematic diagram of an exemplary SVE client device according to an embodiment of the present disclosure. It is contemplated by the present disclosure that the SVE client device 1 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As shown in FIG. 13, the exemplary SVE client device 1 includes one or memories or memory locations including a main memory 50 and a protected memory 51 as well as an I/O interface 52, a user interface 53, a network interface 54, and one or more processors 55. The main memory 50 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy. The protected memory 51 is, for example, a processor reserved memory of dynamic random access memory (DRAM) or other reserved memory module or secure memory location maintained separate from the main memory 50.

The main memory 50 can be used to store any type of instructions associated with algorithms, processes, or operations for controlling the general functions of the SVE client device 1 including the operations of the quoting enclave 8 and the untrusted software 7 as well as any operating system such as Linux, UNIX, Windows Server, or other customized and proprietary operating systems. The protected memory 51 on the other hand is used to store the PSE 6 and its associated parameters such as device key sets, digital keys, certificates, and the like. The I/O interface 52 can be an interface for enabling the transfer of information between SVE client device 1 and external devices such as peripherals connected to the SVE client device 1 that need special communication links for interfacing with the one or more processors 55. The I/O interface 52 can be implemented to accommodate various connections to the SVE client device 1 that include, but is not limited to, a universal serial bus (USB) connection, parallel connection, a serial connection, coaxial connection, a High-Definition Multimedia Interface (HDMI) connection, or other known connection in the art connecting to external devices.

The user interface 53 is implemented for allowing communication between a user and the SVE client device 1. The user interface 53 includes, but is not limited to, a mouse, a keyboard, a liquid crystal display (LCD), cathode ray tube (CRT), thin film transistor (TFT), light-emitting diode (LED), high definition (HD) or other similar display device with touch screen capabilities. The network interface 54 is a software and/or hardware interface implemented to establish a connection between the SVE client device 1 and the servers 2, 3, 4 in the system described in FIG. 1. It is contemplated by the present disclosure that that network interface 54 includes software and/or hardware interface circuitry for establishing communication connections with the rest of the system using both wired and wireless connections for establishing connections to, for example, a local area networks (LANs), wide area networks (WANs), metropolitan area networks (MANs) personal area networks (PANs), and wireless local area networks (WLANs), system area networks (SANs), and other similar networks.

The one or more processors 55 are used for controlling the general operations of the SVE client device 1. Each one or the one or more processors 55 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the SVE client device 1. Communication between the components of the SVE client device 1 (e.g., 50-55) are established using an internal bus 57.

FIG. 14 is a schematic diagram of an exemplary system server according to an embodiment. It is contemplated by the present disclosure that the server 60 shown in FIG. 14 is representative of the systems servers 2, 3, 4 shown in FIG. 1. It is also contemplated by the present disclosure that server 60 includes electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As shown in FIG. 14, the exemplary server 60 includes a main memory 61, an I/O interface 62, a user interface 63, a network interface 64, one or more processors 65, and a hardware security module (HSM) 66. The main memory 61 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 61 can be used to store any type of instructions associated with algorithms, processes, or operations for controlling the general functions of the server 60 as well as any operating system such as Linux, UNIX, Windows Server, or other customized and proprietary operating systems. The I/O interface 62 can be an interface for enabling the transfer of information between server 60 and external devices such as peripherals connected to the server 60 that need special communication links for interfacing with the one or more processors 65. The I/O interface 62 can be implemented to accommodate various connections to the server 60 that include, but is not limited to, a universal serial bus (USB) connection, parallel connection, a serial connection, coaxial connection, a High-Definition Multimedia Interface (HDMI) connection, or other known connection in the art connecting to external devices.

The user interface 63 is implemented for allowing communication between a user and the server 60. The user interface 63 includes, but is not limited to, a mouse, a keyboard, a liquid crystal display (LCD), cathode ray tube (CRT), thin film transistor (TFT), light-emitting diode (LED), high definition (HD) or other similar display device with touch screen capabilities. The network interface 64 is a software and/or hardware interface implemented to establish a connection between the server 60, and other servers in the system as well as well as with the SVE client device 1, as described in FIG. 1. It is contemplated by the present disclosure that that network interface 64 includes software and/or hardware interface circuitry for establishing communication connections with the rest of the system using both wired and wireless connections for establishing connections to, for example, a local area networks (LANs), wide area networks (WANs), metropolitan area networks (MANs) personal area networks (PANs), and wireless local area networks (WLANs), system area networks (SANs), and other similar networks.

The one or more processors 65 are used for controlling the general operations of the server 60. Each one or the one or more processors 65 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the SVE client device 1. The HSM 66 is a secure memory location or memory module that provides hardware security for private key and the Unwrap Keys as well as provides a secure environment for executing cryptographic operations and generating temporary session keys, if necessary. It is contemplated by the present disclosure that the HSM 66 can be implemented as a hardware element or implemented using software techniques such as white-box cryptography.

Communication between the components of the SVE client device 1 (e.g., 61-66) are established using an internal bus 67.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components which perform a part or all of the functions described in the present disclosure.

The present disclosure includes the use of computer programs or algorithms. The programs or algorithms can be stored on a non-transitory computer-readable medium for causing a computer, such as the one or more processors, to execute the steps described in FIGS. 2-9, 11, and 12. For example, the one or more memories stores software or algorithms with executable instructions and the one or more processors can execute a set of instructions of the software or algorithms in association with executing generating and processing provisioning and re-provisioning messages, and provisioning and re-provisioning responses, as described in FIGS. 2-9, 11, and 12.

The computer programs, which can also be referred to as programs, software, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner.

The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

Various modifications to the disclosure will be readily apparent to those skilled in the art, and the generic principles defined herein may be applied to other variations without departing from the spirit or scope of the present disclosure. Throughout the present disclosure the terms "example," "examples," or "exemplary" indicate examples or instances and do not imply or require any preference for the noted examples. Thus, the present disclosure is not to be limited to the examples and designs described herein but is to be accorded the widest scope consistent with the principles and novel features disclosed.

We claim:

1. A method for distribution of device key sets over a network, the method comprising:
   generating a provisioning request including a protected software environment key agreement public key in a protected software environment (PSE) of a client device, and sending the provisioning request along with a PSE hash and a PSE signature to a quoting enclave of the client device to obtain a quote and an enhanced privacy ID (EPID) signature;
   obtaining from a crypto hardware (CH) token, belonging to a user, a token signature for the provisioning request and a token certificate;
   combining the provisioning request, the quote, the EPID signature, the token signature, and the token certificate using untrusted software to form a provisioning message, and transmitting the provisioning message from the client device to an attestation proxy server (APS) using a first network connection;
   attaching an APS signature and an APS certificate to the provisioning message based on a result of a verification of the EPID signature in an attestation server, and transmitting the provisioning message along with the APS signature and the APS certificate from the APS to an online provisioning server (OPS) using a second network connection;
   generating a provisioning response in OPS that includes an encrypted device key set, and delivering the provisioning response to the PSE using the first and second network connections,
   wherein the PSE decrypts the encrypted device key set included with the provisioning response to obtain the device key set, re-encrypts the device key set with a local chip-specific sealing key, and stores the re-encrypted device key set.

2. The method according to claim 1, wherein the CH token is a password-protected universal serial bus (USB) token inserted into an I/O interface of the client device, and the untrusted software obtains the token signature and the token certificate after a valid password is entered by the user.

3. The method according to claim 1, further comprising and using the untrusted software:
   transmitting the PSE hash to the CH token and receiving the PSE hash signed using the token signature as an authenticator object;
   requesting and receiving the token certificate; and
   attaching the authenticator object and the token certificate to the provisioning request,
   wherein the APS verifies the signature of the authenticator object and then attaches the APS signature and the APS certificate to the provisioning message based on the verification result.

4. The method according to claim 3, further comprising, in the OPS: 1) verifying the signature of the authenticator object and the token certificate; 2) verifying the APS signature and the APS certificate; 3) deriving an OPS key agreement public key and a shared key derived from a key agreement algorithm; 4) selecting a next available encrypted device key set along with a corresponding transport key (TK) and encrypting the TK using the shared key; and 5) attaching an OPS signature and an OPS certificate to the provisioning response containing the OPS key agreement public key, the encrypted device key set, and encrypted TK.

5. The method according to claim 1, where device key set includes a PSE private key and a PSE certificate.

6. The method according to claim 5, further comprising:
   generating a re-provisioning request for a new device key set in the PSE where a signature is generated by the PSE private key instead of the token signature and the PSE certificate replaces the token certificate and both the PSE private key and the PSE certificate were provisioned as part of a device key set and previously stored in the PSE.

7. The method according to claim 4, further comprising, in the PSE, 1) verifying the OPS signature and the OPS certificate; 2) deriving the shared key based on a key agreement algorithm; 3) decrypting the TK using the shared key; and 4) decrypting the encrypted device key set using the TK in order to obtain the device key set.

8. The method according to claim 4, further comprising, in the OPS, after selecting the next available device key set along with the corresponding TK:
   1) unwrapping the TK key in a hardware security module (HSM) using an unwrap key; and
   2) wrapping the TK in the HSM using the shared key, the shared key being a one-time key generated in the HSM based on a key agreement algorithm.

9. A system for distribution of device key sets over a network, the system comprising:
   a client device including:
      a connection interface for receiving a crypto hardware (CH) token belonging to a user;
      a non-transitory memory configured to store one or more programs, untrusted software, a quoting enclave, and a protected software environment (PSE);
      a hardware processor configured to execute the one or more programs to perform operations of the untrusted software, the quoting enclave, and the PSE; and
      a network interface configured to establish communication with a network using a first network connection,
      wherein when the one or more programs are executed by the hardware processor:
         the PSE generates a provisioning request including a PSE key agreement public key,
         the untrusted software sends the provisioning request along with a PSE hash and a PSE signature to the quoting enclave to obtain a quote and an enhanced privacy ID (EPID) signature, the untrusted software obtains from the CH token a token signature for the provisioning request and a token certificate, combines the provisioning request, the quote, and the EPID signature, the token signature, and the token certificate to form a provisioning message, and transmits the provisioning message from the client using the first network connection;

an attestation proxy server (APS) configured to receive the provisioning message using the first network connection and attach an APS signature and an APS certificate to the provisioning message based on a result of a verification of the EPID signature in an attestation server, and transmit the provisioning message along with the APS signature and the APS certificate from the APS using a second network connection; and an online provisioning server (OPS) configured to receive the provisioning message using the second network connection and generate a provisioning response including an encrypted device key set, and deliver the provisioning response to the PSE using the first and second network connections, wherein the PSE decrypts the encrypted device key set in the provisioning response to obtain the device key set, re-encrypts the device key set with a local chip-specific sealing key, and stores the re-encrypted device key set.

10. The system according to claim 9, wherein connection interface is an I/O interface and the CH token is a password-protected universal serial bus (USB) token inserted into the I/O interface of the client device, and the untrusted software obtains the token signature and the token certificate after a valid password is entered by the user.

11. The system according to claim 9, wherein when the one or more programs are executed by the hardware processor:

the PSE transmits the PSE hash to the CH token and receives the PSE hash signed using the token signature as an authenticator object;

requests and receives the token certificate; and attaches the authenticator object and the token certificate to the provisioning request, wherein the APS verifies the signature of the authenticator object and then attaches the APS signature and the APS certificate to the provisioning message based on the verification result.

12. The system according to claim 9, further comprising an OPS database configured to be connected to the OPS and store device key sets, certificates, transport keys (TKs), private keys and other encryption keys, calculated device key expiration times, and configurable parameters.

13. The system according to claim 12, wherein the OPS further comprises a hardware security module (HSM), and wherein the OPS is configured to, after selecting a next available device key set along with a corresponding TK:

1) unwrap the TK in a hardware security module (HSM) using an unwrap key; and 2) wrap the TK in the HSM using the shared key, the shared key being a one-time key generated in the HSM based on a key agreement algorithm.

14. An apparatus for distribution of device key sets over a network, the apparatus comprising:

a connection interface for receiving a crypto hardware (CH) token belonging to a user;

a non-transitory memory configured to store one or more programs, untrusted software, a quoting enclave, and a protected software environment (PSE);

a hardware processor configured to execute the one or more programs to perform operations of the untrusted software, the quoting enclave, and the PSE; and a network interface configured to establish communication with a network using a first network connection, wherein when the one or more programs are executed by the hardware processor:

the PSE generates a provisioning request including a protected software environment (PSE) key agreement public key;

the untrusted software sends the provisioning request along with a PSE hash and a PSE signature to the quoting enclave to obtain a quote and an enhanced privacy ID (EPID) signature;

the untrusted software obtains from the CH token a token signature for the provisioning request and a token certificate, combines the provisioning request, the quote, and the EPID signature, the token signature, and the token certificate to form a provisioning message, transmits the provisioning message from the client device to an attestation proxy server (APS) using a first network connection, and receives a provisioning response including the encrypted device key set from an online provisioning server (OPS) using the first network connection, and wherein the PSE decrypts the encrypted device key set in the provisioning response to obtain the device key set, re-encrypts the device key set with a local chip-specific key and stores the re-encrypted device key set.

15. The apparatus according to claim 14, wherein the connection interface is an I/O interface and the CH token is a password-protected universal serial bus (USB) token inserted into the I/O interface of the client device, and the untrusted software obtains the token signature and the token certificate after a valid password is entered by the user.

16. The apparatus according to claim 14, wherein when the one or more programs are executed by the hardware processor, the untrusted software:

transmits the PSE hash to the CH token and receives the PSE hash signed using the token signature as an authenticator object;

requests and receives the token certificate; and attaches the authenticator object and the token certificate to the provisioning request.

* * * * *